United States Patent
Egger et al.

(10) Patent No.: US 10,915,738 B2
(45) Date of Patent: Feb. 9, 2021

(54) PREFERENCE IMPLEMENTATION SYSTEM FOR ACTING ON PREFERENCES OF FACILITY VISITORS

(71) Applicant: DISNEY ENTERPRISES, INC., Burbank, CA (US)

(72) Inventors: James Lee Egger, Orlando, FL (US); Mihail A. Ambrozie, Orlando, FL (US); Luis M. Bracamontes Hernandez, Orlando, FL (US); Mangesh Patil, Winter Garden, FL (US); Ravel A. Antunes, Orlando, FL (US); Hariraghav Ramasamy, Orlando, FL (US); John David Worrall, Clermont, FL (US); Ernest L. Martin, Orlando, FL (US)

(73) Assignee: Disney Enterprises, Inc., Burbank, CA (US)

(*) Notice: Subject to any disclaimer, the term of this patent is extended or adjusted under 35 U.S.C. 154(b) by 154 days.

(21) Appl. No.: 16/188,972

(22) Filed: Nov. 13, 2018

(65) Prior Publication Data
US 2020/0151437 A1    May 14, 2020

(51) Int. Cl.
*G06K 9/00* (2006.01)
*G06Q 30/02* (2012.01)

(52) U.S. Cl.
CPC ..... *G06K 9/00295* (2013.01); *G06K 9/00255* (2013.01); *G06K 9/00926* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 10,667,135 B2* | 5/2020 | Grayson | H04W 12/08 |
| 2003/0118216 A1* | 6/2003 | Goldberg | G07F 17/26 |
| | | | 382/115 |
| 2018/0173871 A1* | 6/2018 | Toth | H04L 9/3263 |
| 2019/0009168 A1* | 1/2019 | Aman | A63F 13/26 |
| 2019/0302879 A1* | 10/2019 | Schwarz | G06F 3/0414 |

* cited by examiner

*Primary Examiner* — Randolph I Chu
(74) *Attorney, Agent, or Firm* — Snell & Wilmer L.L.P.; Kent A. Lembke

(57) ABSTRACT

A system for implementing visitor customizations at a facility using selective image recognition. The system includes a processor and memory storing an optical marker definition and, for potential visitors to the facility, a reference file for image-based recognition of a person. The system includes a camera in a space of the facility capturing an image of the space. The system includes an opt-in verification module run by the processor that processes the captured image of the space to identify, based on the optical marker definition, presence of an optical marker. The system includes an image recognition module run by the processor that compares recognizable features in the captured image with the reference files for the potential visitors to recognize the visitor. The memory stores opt-in records for the potential visitors, and permission to use recognition technology is obtained prior to processing by the image recognition module.

20 Claims, 5 Drawing Sheets

PREFERENCE IMPLEMENTATION SYSTEM FOR ACTING ON PREFERENCES OF FACILITY VISITORS

BACKGROUND

1. Field of the Description

The present description relates, in general, to systems and methods for providing goods or services to visitors or customers of a facility, such as a sports stadium, a shopping mall, a restaurant, a hotel, any entertainment venue, or the like, based on their stated or known preferences regarding those goods or services. More particularly, the present description relates to a system, and corresponding method, to offer visitors to a facility a way to communicate their preferences and to subsequently ascertain such visitors' choices in a manner that is not potentially inconsistent with their communicated preferences.

2. Relevant Background

There are many settings where it may be desirable to offer visitors of a facility the opportunity for enhanced experiences by recognizing the visitor. By recognizing a visitor, interactions can be personalized with the visitor's specific characteristics such as name or preferred nickname, the visitor's geographic data, the visitor's VIP (very important person) status, history of previous interactions and future scheduled activities, and other data for personalizing and improving the visitor's experience at a particular facility. For example, a season ticket holder for a sports team may be granted access to the sports team's stadium through an express gate with reduced security requirements. In another example, a visitor to a store may be greeted by name and directed to goods that the visitor has previously indicated they are looking for. In a restaurant setting, a visitor may be seated at a particular table due to their preference for a view, for a quiet or bustling table, for proximity to a fireplace, and so on. Clearly, it is useful for operators of many types of facilities to customize the experience of their visitors in an individual (or group) manner to improve the visitors' overall enjoyment of their experience.

In order to personalize experiences based on a visitor's individual history and characteristics, the operator of the facility should be able to retrieve or access data representing the visitor's history and characteristics. One way to retrieve this data automatically is to use various techniques to recognize enough features about the visitor to enable access to data storage where the visitor's history and characteristics are stored. While there are a variety of techniques to recognize features of visitors, image analysis generally and facial recognition technology, specifically, are effective tools for recognizing features with sufficient accuracy for this task.

Image recognition technology, which includes facial recognition technology, has the potential to provide important, pro-consumer benefits. However, facility operators also have recognized that in certain circumstances, it may be desirable to offer visitors the opportunity to choose whether this recognition occurs and to deploy the recognition technology in a manner that is not inconsistent with such visitors' expressed preferences. With this in mind, facility operators continue to search for the best ways to employ image recognition technology in scenarios where visitors have been offered this choice.

SUMMARY

The inventors recognized that image recognition technology may be useful in a system configured for providing services and/or goods in a facility in a manner that is personalized based on a visitor's history and characteristics. The inventors further recognized that in certain circumstances it may be desirable to offer visitors optionality with respect to the collection or processing of certain types of data that could be used to recognize visitors and to ascertain the visitor's preferences before processing such data types. Some conventional systems may not operate in a manner consistent with visitors' preferences if the systems by design collect or process the very data types for which the visitors are being offered optionality in order to ascertain the visitors' preferences.

In contrast, the inventors created a preference implementation system that securely implements image recognition technology, or any other technology that gathers features of a visitor, to detect each facility visitor's preferences by first determining whether the visitor has chosen to be recognized using the recognition technology in (or near) the facility (or in predefined portions of the facility). Only when that preference has been verified does the system deploy technology to recognize the visitor's features or to use those recognized features to retrieve data about the individual history and characteristics of the visitor. The system, therefore, may be thought of as a two-step recognition system with the first step being used to ascertain the visitor's preferences prior to collection/use of data for which any visitor may decline consent before performing the second step of using recognition technology to retrieve individual history and characteristics.

More particularly, a system is provided for implementing visitor preferences at a facility using selective image recognition. The system includes a processor and memory storing an optical marker definition and, for a set of potential visitors to the facility, a reference file containing, for example, features of people and objects known to the system that can be recognized. The system includes a camera (or cameras) in a space of the facility capturing an image (e.g., frames of a video stream) of the space. The system also includes an opt-in verification module run by the processor that processes the captured image of the space to identify, based on the optical marker definition, a presence of an image of an optical marker. Further, the system includes a recognition module run by the processor that compares an image in the captured image with the reference files for the set of potential visitors to determine when one of the potential visitors is known to the system (i.e., has a corresponding reference file). The image is associated with a person wearing or holding the optical marker, and the recognition module is only run by the processor to process the image after the preferences assigned to the optical marker are verified. The memory further stores an opt-in record for each of the potential visitors, whereby consent or permission to use recognition technology is obtained prior to processing of the facial image by the recognition module.

The system may also include a facial region locator run by the processor, first to determine whether the captured image includes an image of a person and second to determine the relative location of the facial region of the image without obtaining detailed data points from the image. In some implementations, the facial region locator generates a skeleton model to locate the image of the optical marker relative to the image of the person and the location of the facial region in the captured image. The optical marker is physically associated with a particular person wearing the marker and is linked to or directly represents data about the person's preferences. In most embodiments, it is assumed that the linked preferences pertain to the same person that is wearing the optical marker or to a group of people to which the person wearing the optical marker belongs. In some embodiments, the optical marker may explicitly indicate preferences using symbols, images, or barcodes that can be interpreted to reveal the preferences. In some embodiments, the system further includes a preferences database in the memory including, for each of the visitors, a record storing preference data. In these embodiments, the system may further include a preference implementation mechanism run by the processor that modifies one or more systems or devices at the facility based on the preference data linked to the optical marker worn by one of the visitors.

The optical marker may take a wide variety of forms such as a pin, a badge, a token, a wristband, or an article of clothing. Further, the optical marker may have an outer surface with a pattern or a color that matches a pattern or color in the optical marker definition to facilitate accurate and more efficient identification of the optical markers in an image stream. In some cases, the captured image includes an image of a second person not wearing or holding an object matching the optical marker definition and wherein the opt-in verification module fails to identify the presence of an image of an optical marker and, in response, the recognition module does not process the image of the second person.

DETAILED DESCRIPTION

Figure 1:
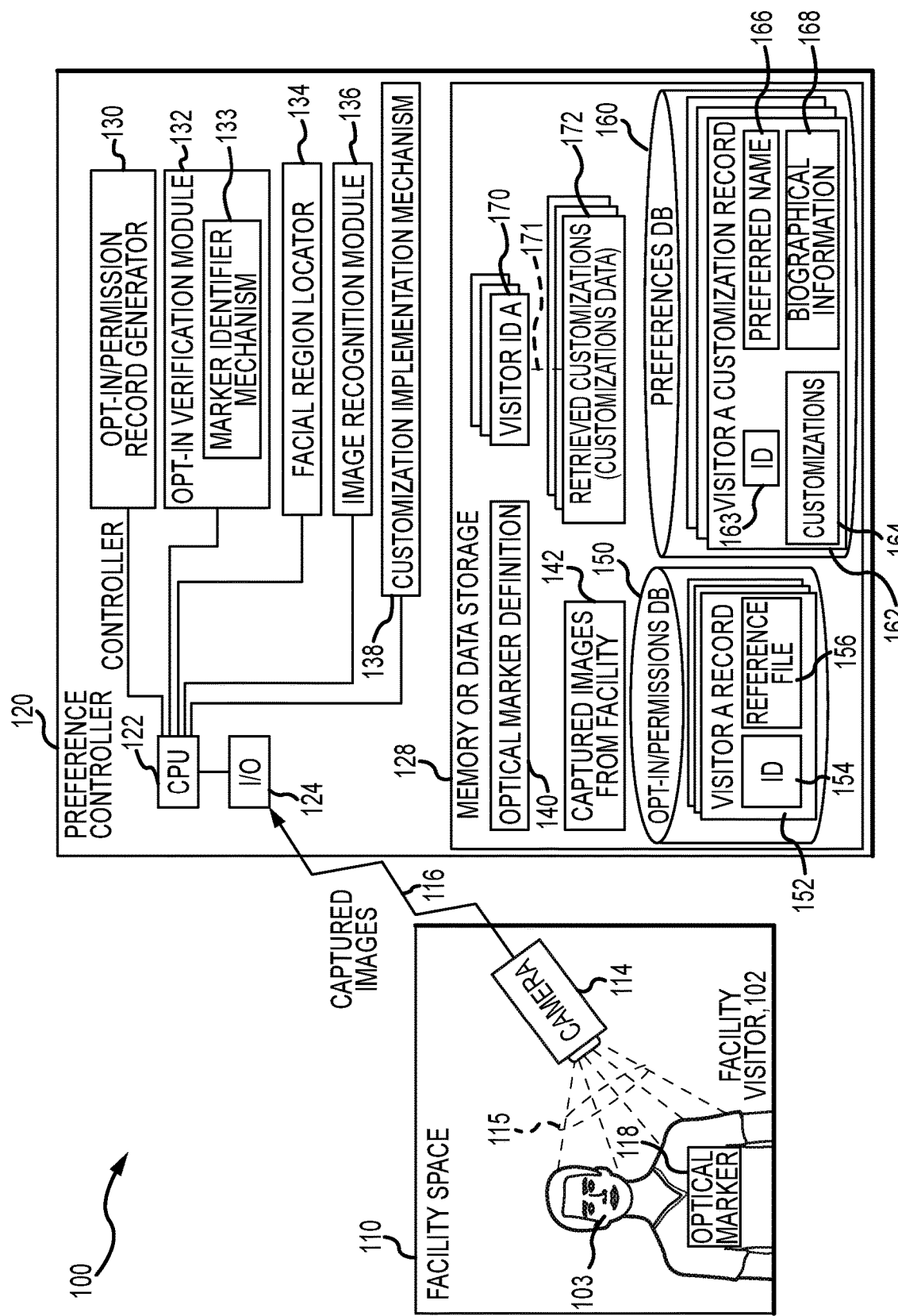
FIG. 1 is a schematic or functional block drawing of a preference implementation system of the present description.

The following description is directed toward a preference implementation system (and corresponding methods) that uses selective recognition to act on the privacy preferences of visitors of a facility. The system is useful for nearly any facility such as an entertainment facility including a sporting event stadium/arena, a concert or theater venue, a transportation system or hub, or the like, such as a shopping mall or store, such as at a restaurant or other dining establishment, such as at a resort or other lodging facility, such as at an airport building to provide VIP recognition, such as at a train, monorail, or bus loading/unloading facility to enhance transportation services, and other facilities.

In designing the new system, the inventors understood that recent advances in computing capabilities have led to increased interest in adopting image recognition technologies. The use cases for image recognition are wide ranging and include custom tailored experiences, improved safety and security as well as faster facility entry/access. It was also understood by the inventors that incorporating recognition technologies to provide these enhancements should be implemented in a manner that respects recognition and personalization preferences in a manner that is consistent with permissions and restrictions established by the visitors.

Further, the inventors recognized that even if prior consent is acquired (e.g., by allowing visitors to explicitly opt-in), the validation of the opt-in or consent in the past has presented a "Catch-22." For example, two or more people or even a crowd of visitors may be in a camera's view. Prior to the present invention, it was difficult to know who in the crowd has opted in, and facial recognition cannot be used on everyone's face to find out because by doing so could be inconsistent with privacy preferences of some in the crowd (i.e., the visitors that have not provided prior consent). In contrast, the new preference implementation system is designed to use techniques in computer vision and parallel processing while wholly respecting the recognition and personalization preferences of visitors to a facility in which the system is installed and used to enhance visitors' experiences based on their individual history and characteristics (e.g., for goods, services, and the like). Each visitor can be provided customized interactions or other experiences using selective image recognition as their image is only recognized if they have opted in to the preference system.

Briefly, the preference implementation system includes a wearable token or marker that allows the system to determine and honor recognition preferences of facility visitors and to separate the process of individual recognition (which may sometimes involve facial recognition). For example, the recognition process can be separated into the following three steps: (1) consent validation; (2) facial location mapping; and (3) identification. In consent validation, the system includes unique optical markers or tokens that are worn by, carried by, or otherwise physically associated with visitors that have registered their recognition preferences (e.g., provided consent such as through an opt-in process). The optical markers may explicitly indicate preferences using symbols or codes that can be optically read and interpreted. More commonly, the optical markers indirectly indicate recognition preferences through a link to preference data records associated with the optical marker. The optical marker may take nearly any form or a specific shape (shape of an object can be detected via a camera), such as a wristband or pin/badge worn by the set of opted-in visitors to let the algorithm know about their consent. The system may use a machine learning system that is trained to recognize this marker/token in the camera feed (from a camera positioned to capture images of a particular facility space) in a short time (e.g., in milliseconds). Facial location mapping may involve using human skeletal modeling to identify the location or region in the captured image of the faces of the visitors that have been determined to be wearing (or carrying) an optical token or marker.

Once the location of the visitors' faces in the image is known for the visitors that have opted-in, recognition is performed on the selected faces to identify geometric and/or statistical features sufficient to determine whether a match exists among the reference files. The process performed by the preference implementation system ensures that a recognition algorithm is only run on the individuals that show their consent by wearing an optical marker/token (that may be facility or multi-facility specific or sub-facility specific). In some embodiments, though, the wearing of the optical marker/token is worn to opt-out or show lack of permission to perform recognition such as in environments where the majority has or is likely to opt-in (by providing permission as systems typically will not have default opt-in) such as at a sporting event, a concert, embarking portion of a cruise, or the like. The new preference implementation system has the following and additional advantages: (a) allows for guests of a facility to express preferences; (b) continuous scanning for fast detection; (c) simple implementation; and (d) faster entrance/access wait times to a facility or portions of a facility.

FIG. 1 illustrates a functional block diagram of a preference implementation system 100 of the present description that is useful for respecting recognition preferences of facility visitors while also acting upon their individual history, future plans, and characteristics to create enhanced and customized experiences. The system 100 typically is implemented at a facility, such as a shopping mall, a resort, a theme park, a sports arena/stadium, or the like, and, in this regard, it includes a facility space 110 that is accessed by a visitor 102 (one visitor being shown but it being understood that typically numerous visitors may be present in the space 110). In this example, the visitor 102 has consented to (or opted in) participating in image recognition while in the space 110, but other visitors (not shown) may also be in the space 110 who have not consented/opted-in. In this regard, the visitor 102 who has consented/opted-in is given an optical marker/token 118 to wear (as shown) or carry or place on their person so that it is in view (e.g., pinned to their outer clothing, worn on a portion of the body that is not covered by clothing, and so on). Optical marker 118 may be plainly visible and recognizable to other people or may instead comprise a more discrete item such as jewelry, an item of clothing, a patch, or other item that can be located and perceived by the system 100.

To facilitate consent validation and identification using image recognition, the system 100 includes a camera(s) 114 in or near the space 110 that is positioned and focused (or focusable) to capture images 115 of the space 110. The images 115 include images (still or a video stream) of the visitor 102 that include the optical marker 118 (when visible) as well as visible features of visitor 102 (which may include visitor's face 103), which can be used to recognize the visitor 102 using image recognition technology (such as that provided with image recognition module 136). The output from the camera 114 is transmitted in a wired or wireless manner as shown with captured images 116 to a preference controller 120 of the system 100 in an ongoing or continuous (or periodic in some cases) manner so that visitor 102 moving through the space 110 can be continuously, periodically, or occasionally scanned to validate consent and, when consent is validated, to recognize them.

The controller 120 may take a wide variety of forms to practice the system 100 and may include one or more computing and communication devices including desktop, laptop, notebook, pad, and other general purpose or special purpose computers as well as wireless communication devices including cellular and smartphones. As shown, the controller 120 includes a processor(s) 122 that manages operations of input/output (I/O) devices 124 that may include display devices (e.g., to present a graphical user interface (GUI) to an operator), a touchscreen, a keyboard, a mouse, voice recognition equipment, and communication (wired and wireless) devices that operate to receive the captured images 116 from the camera(s) 114 in the facility space 110. The controller 120 also includes or has access to memory and/or data storage devices 128, and the processor 122 manages data storage and retrieval from the memory 128 including storing the captured images from the facility as shown at 142. Software and/or executable code may also be stored in memory/data storage 128 to provide the functionality of the controller including to provide the opt-in/permission record generator 130, the opt-in verification module 132, the facial region locator 134, the image recognition module 136 (which may utilize facial recognition software/techniques), and the preference implementation mechanism 138.

During operations of the system 100, the controller 120 may use the opt-in/permission record generator 130 to create and populate an opt-in/permissions database 150 stored in memory 128 or other data storage accessible by the controller 120. In many cases, the function of the generator 130 may be performed off-line or by another device (not shown) in system 100 or by another system. For example, many implementations of the system 100 will have a separate registration process where reference images are taken and processed to load reference records into the opt-in database 150, with a single registration site serving hundreds or thousands of facility space sites. The significant point is that image recognition is only performed upon visitors 102 that have provided prior consent or permission to the use of this technology to recognize them when they are in the space 110. To this end, the generator 130 acts to create a visitor record 152 in the database 150 for each visitor 102 that has provided consent. The record 152 may include, as shown, an identifier or identification value/parameter 154 that is unique to each visitor, and the record 152 may also include a reference file 156 for each visitor that contains data representing recognizable features of the visitor 102 (e.g., data or a statistical model derived from an image of a visitor 102 (e.g., of their face 103) created by processing a still image of recognizable features) useful for comparison by an image recognition module 136.

Figure 2:
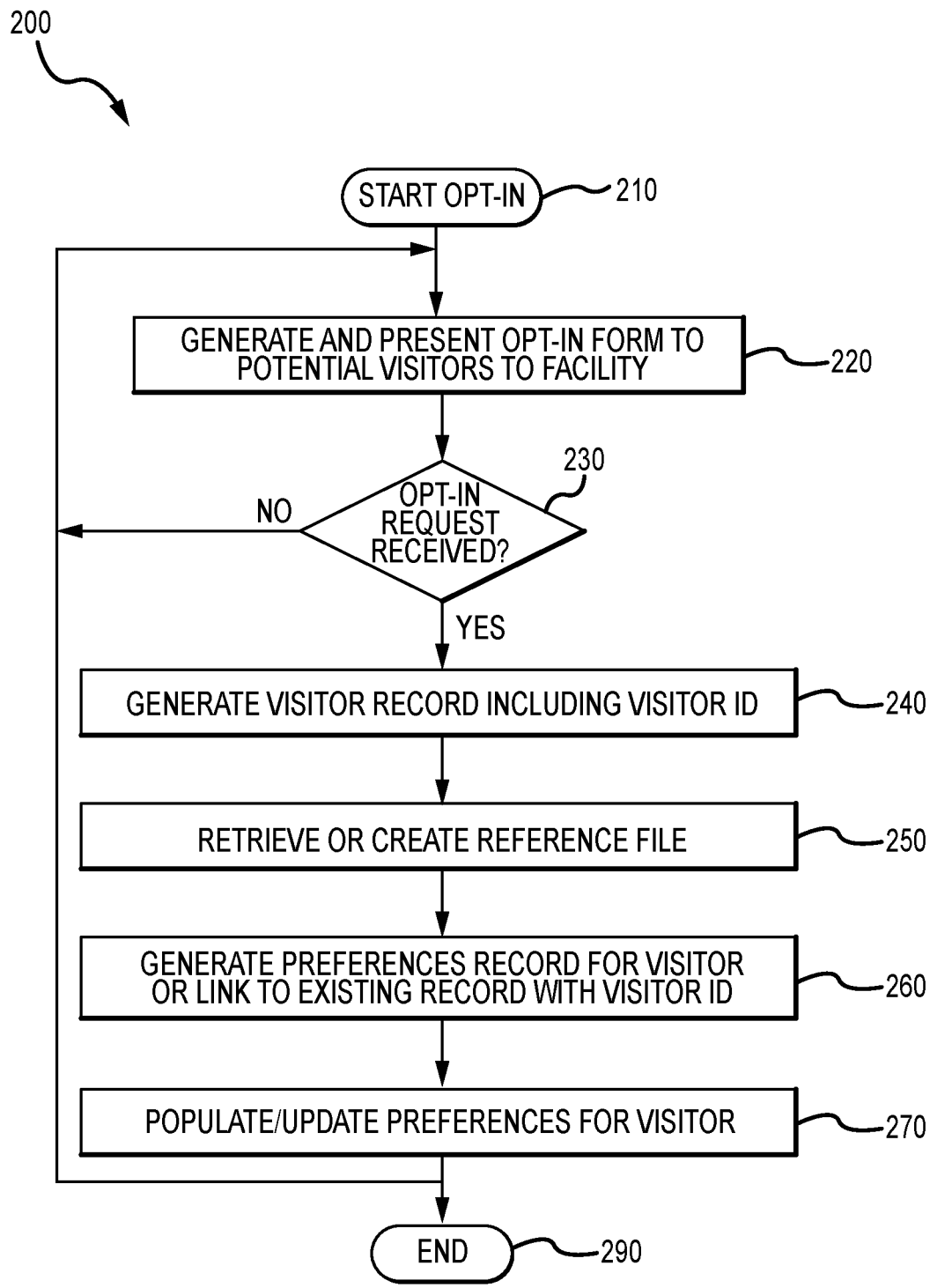
FIG. 2 is a flow diagram of an opt-in method as may be performed during operations of the system of FIG. 1 (or prior to or offline from its operations)

The generator 130 may perform all or a portion of the opt-in method 200 shown in FIG. 2. The opt-in method 200 may optionally start at 210 such as with loading the generator 130 on the controller 120 or another device (such as a server used to serve opt-in forms via the Internet or through GUIs on devices provided on the facility with space 110 such as during check-in or ticket purchase at a facility). Note, as discussed above, step 210 may be wholly or partially carried out using a separate registration process and/or server. At step 220, an opt-in form, such as a fillable, digital form or a GUI with questions, is generated and presented to one or more potential visitors to the facility. For example, the visitor 102 may have, prior to their visit to the space 110, operated a user device (e.g., their home or work computer, their smartphone, their network-accessing device, or other device capable of presenting the relevant opt-in information and conducting transactions sufficient to obtain valid consent from the visitor 102) to visit a website and be presented an opt-in form on the display of their user device. This form may include information to help the visitor 102 make an informed decision and a question to answer or box to check that requests explicit permission from the user to use scans of their face to perform facial recognition while they are in (or accessing) the space 110. They may also be informed that without such permission the facility operator will not perform recognition and how that may impact their facility visit. In some embodiments, the visitors may have the ability to select what types of access or experiences can use recognition technology (e.g., choose a subset of accesses/experiences in a facility where permission is given). For example, the visitor could provide permission for performing facial recognition for access to a facility or portion of a facility and use this for payment, but the same visitor may indicate that facial recognition should not be used for entertainment experiences. The level of granularity and precision of the privacy preferences obtained during registration is flexible to meet the needs of a particular application and situation from a single opt-in for all purposes to an arbitrary level of detail covering various events, locations, time of day or other criteria that are relevant to visitors 102.

At step 230, a determination is made whether an opt-in request/permission has been received from a potential facility visitor. If not, the method 200 continues with performance of step 220. If received, the method 200 continues at 240 with generating a visitor record (such as record 152 shown in FIG. 1) including the visitor's ID (such as ID value/identifier/user ID 154). The method 200 continues at 250 with retrieving (such as from a message provided by the visitor) or creating a reference file 156 at operation 250. Creating a reference file at 250 may involve capturing a digital image that contains visible features then extracting features and/or performing statistical analysis on the captured image to create a reference file 156 with content and format that is useful for comparisons with images captured (images 142) at the facility. This reference file may be stored in the visitor's record 152 as reference file 156 in FIG. 1, and this file may be processed to create a set of features or statistical model from an image used by a particular recognition software/algorithm (such as module 136 of FIG. 1) in performing recognition comparisons. A variety of biometric and non-biometric features may be used to meet the needs of a particular implementation, such as facial features, finger vein features, an eye iris (e.g., retinal features), voice features (e.g., have visitors make a voice statement that is recorded/captured such as "This is John Smith"), clothing, jewelry, hair style, and any other information that is physically associated with a visitor and can be visibly or audibly ascertained. While not shown, the system 100 may include audio capture (e.g., one or more microphones and/or recording systems) and processing components with the reference file 156 including voice features for comparisons. In other cases, the visitor may provide a verbal pass phrase that is used such as "Hello Facility Operator."

The method 200 then continues at 260 with generating a customization record 164 for the opted-in visitor or a link to an existing record (such as a link based on the visitor's ID used or created in step 240). The created record is then populated with visitor-provided or system-determined (or retrieved) preferences for the visitor in step 270. The method 200 may then continue at 220 or end at 290. As shown in FIG. 1, the memory 128 is used to store a preferences database 160 or, in many preferred embodiments, this may be stored on one or more other data storage devices accessible by the controller 120. The database 160 includes a visitor customization record 162 for each visitor 102 that provides a consent or opt-in. This record 162 is linked to the visitor's opt-in record 152 such as with an identifier or ID value 163 that matches or is otherwise cross-references to the ID 154 in opt-in record 152 to make looking up or retrieving the visitor's preferences efficient and accurate.

The customization data stored in the visitor customization record 162 may vary widely to practice the system 100 and may vary from facility-to-facility or from facility operator-to-facility operator. Generally, the record 162 may include customizations 164 for the visitor 102, which may include customizations suited to the goods and services provided in the facility space 110 (or other spaces, not shown, of the facility). These may include historic information such as the purchase level of the visitor 102 and status information such as whether the visitor is a VIP or part of some reward/frequent buyer program offered via the facility or its operator. The customizations 164 may also include customizations selected by visitor 102 such as seating selections, access assistance selections, dining selections, clothing selections, and so on. The data in visitor customization record 162 may also include selections in other forms such as their name/nick name 166 (i.e., what title or name should workers of the facility when they address the visitor) and biographical information 168 for the visitor 102 that may be useful in providing personalized and/or unique experiences while in the space 110. Customization record 162 may also include future selections such as might be represented in an itinerary of future activities and plans so that a current experience can be customized using knowledge of future plans.

The memory 128 is also shown to store a definition 140 of one or more optical marker/token design(s) that is to be used in the space 110 to indicate each visitor 102 that has opted in to an image recognition-based preference process. Each opt-in visitor 102 is asked to wear (or carry) an optical marker 118 fabricated or produced to match this design definition 140. The marker/token 102 may take nearly any form that allows an opt-in verification module 132 to identify or recognized it within the captured image stream 142 from the camera 114 of the space 110. To this end, the module 132 may run or call a marker identifier mechanism 133 that compares the definition 140 to the captured images 142 to identify markers 118 and determine which visitor 102 is wearing or associated with the marker 118. The marker identifier mechanism 133 can be said to perform consent validation and may use an algorithm or machine learning model trained to recognize (in milliseconds in some cases) the presence of the optical marker 118 via processing the image stream 142 with the optical marker definition 140.

Figure 3A:
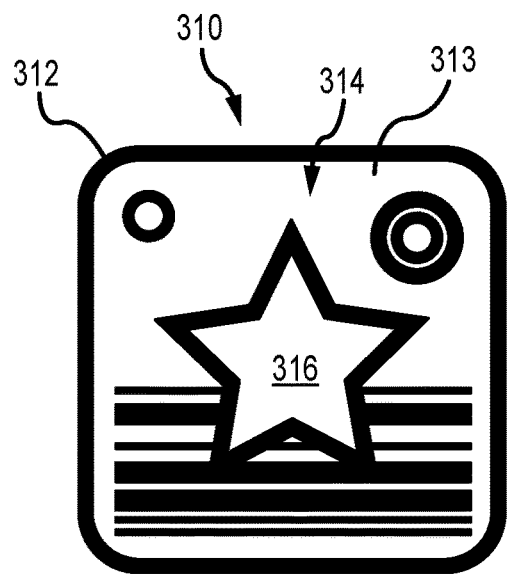
FIGS. 3A-3C illustrate exemplary optical markers that may be used in a preference implementation system, such as the system of FIG. 1, to identify facility visitors that have provided permission to use recognition technology.
Figure 3B:
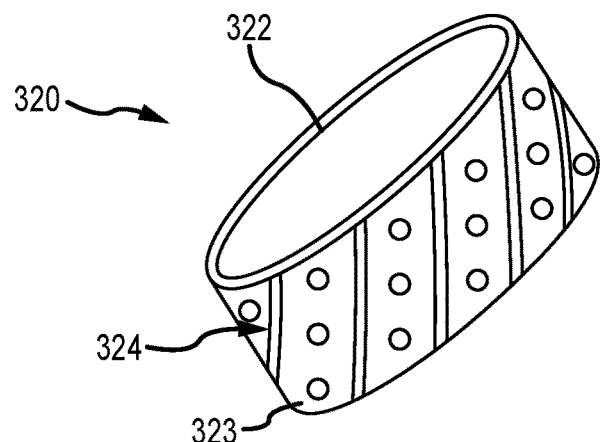
Figure 3C:
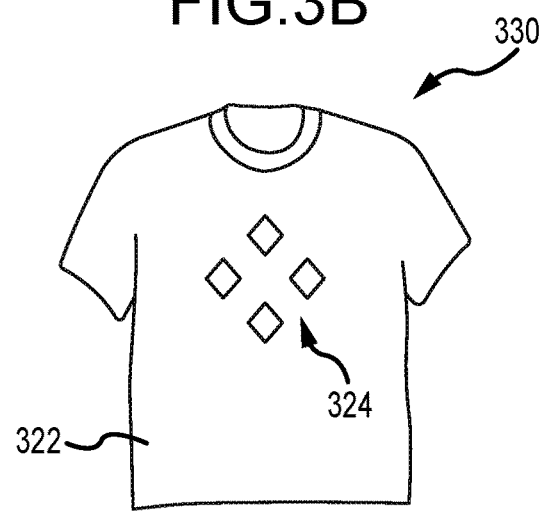

The optical marker 118 may take numerous forms so that it is readily recognizable in the images 142 by the marker identifier mechanism 133. FIGS. 3A-3C illustrate three useful, but not limiting, marker examples. FIG. 3A shows a marker 310 that is in the form of a pin or badge that may be worn or pinned onto a visitor's outer clothing so that it is visible in camera views. The pin/badge has a body 312 with a front side or outer surface 313. On this side/surface 313, a pattern 314 is printed (or otherwise formed) that can be "read" or recognized by the mechanism 133. As shown, the pattern 314 (e.g., an optional black and white (or colored) two-dimensional bar code or quick response (QR) code or the like), which is modified to be more quickly or easily recognized by inclusion of a larger blank center feature 316 with a relatively large outer boundary (here a star shape is used but nearly any shape may be used and may coincide with marketing logos or designs of the facility operator in some cases).

FIG. 3B illustrates another example of an optical marker/token 320 that is configured as a wearable wristband or collar. It has a cylindrical or hoop-shaped body 322 with an outer side or surface 323 upon which a unique pattern 324 is printed. The pattern 324 is chosen to match a marker definition and can be useful for making the wristband-type optical marker 320 more likely to be unique when compared with other commonly worn wristbands. In other cases, the optical marker 320 may include the pattern 314 used on the pin/badge-type marker 310. In still other cases, the width of the band-shaped marker 320 alone or in combination with other design parameters such as outer textures or color of surface 323 may be used to make the optical marker 320 unique and useful to validate and act in accordance with recognition preferences indicated by a wearer.

FIG. 3C illustrates an optical marker 330 that takes the form of an article of clothing. In this case, the marker 330 is shown to be a shirt with an outer surface or side 322. This surface/side 322 may be provided in a particular color that alone or in combination with other design features (such as the shirt's color style or location, the sleeve lengths, and so on) may be used by the marker identifier mechanism 133 to determine the marker 330 matches the definition 140 so indicates the wearer's opt-in to the preference program. As shown, though, the outer surface/side 322 may further (or separately) include a pattern/image 324 (such as an arrangement of polygonal or other shape of a predefined size, number, and/or location) that makes the shirt-type marker 330 more unique when compared with other clothing worn by visitors to the space 110 to limit false positives during validation by the mechanism 133. In some cases, the surfaces visible on the markers may include special inks and/or materials to make them more readily identifiable such as ultraviolet (UV) and/or infrared (IR) reactive inks/materials. Further, a unique "marker" may be provided such as with the visitor 102 performing a particular gesture when in the facility space 110 that confirms alone or when in conjunction with the optical marker 118 that the visitor 102 provides permission for image recognition by system 100.

The controller 120 also includes a facial region locator 134 that acts to process the image 142, after determination that an image of a visitor 102 with a marker 118 is present, to determine the region or portion of the image 142 that is likely to contain an image of the visitor's face 103. This process may be thought of or labeled as facial location mapping. Importantly, facial location mapping determines where a face exists in an image without performing any recognition of the face 103. In one embodiment, the locator 134 uses human skeletal modeling, such as, but not limited to, that provided by an open source framework such as OpenPose by CMU-Perceptual-Computing-Lab that provides postural keypoints based on video input or the like. This skeletal modeling is useful for enabling the locator 134 to identify the bounding boxes ((x, y) coordinates) of the image of the face 103 for the visitor 102 (the person in the space 110 determined to be wearing the optical marker 118). In some embodiments of the controller 120, the consent validation and facial location mapping performed by the opt-in verification module 132 and the facial region locator 134 are performed in parallel such as by using the Robot Operating System (ROS) or other hardware/software configurations to execute nearly instantaneously.

Once the facial location has been determined or mapped and the consent validation has been performed, the system 100 may use the image recognition module 136 to perform recognition of the visitor 102. The bounding boxes of the face 103 may be used by the module 136 to run facial recognition on the image of face 103 cropped from the camera view provided by captured images 142. Additionally, the in-facility process might involve preprocessing to account for lighting, motion, camera angle, zoom, and the like, which will vary in-facility as compared to images captured at registration time with controlled lighting and the like. This may involve comparing the cropped image of face 103 to facial and/or other image files in reference file 156 in opt-in records 152 until a match is found. The processing by module 136 may involve first creating a set of features or a statistical model from the cropped image of the face 103 using the same techniques that were used to create the reference file 156 and second comparing this set of features or statistical model with like data in reference files 156 to find a match (or a match with a predefined amount of confidence or accuracy). Image recognition technology is well-known in the computer industry and is not described in great detail here with the understanding that the image recognition module 136 may take the form of nearly any available software (and hardware if needed) useful in performing image recognition by processing input video (or still) image 142 along with previously stored reference records 156.

The result of the recognition operation is used to find, in this example, the visitor record 152 with a matching reference file 156. The identifier or ID value 152 of this record is then used to access or retrieve from the customizations record 162. Hence, the module 136 (or another software module such as the preferences implementation mechanism 138) stores visitor IDs 170 retrieved based on image recognition after optical marker verification along with linked and retrieved customization data 172 for this visitor 102, e.g., the customizations 164, the selected name 166, the biographical data 168, and, in some cases, the facial image itself if stored with visitor record 152 (for display to workers of the facility space 110 to allow them to better identify the visitor 102 and interact in a personalized manner with them).

The customization implementation mechanism 138 may then use the retrieved customizations 172 to act on the customization data for the visitor 102 to individualize and otherwise enhance the experiences of the visitor 102 in the facility space 110. This may include any of all of the following: (a) providing them customized access to the space 110; (b) addressing them by their selected name 166; (c) using the biographical information in interactions with workers in the facility; (d) directing the visitor 102 toward goods in a store based on the customizations 164; (e) providing dining or drinking recommendations based on the customizations 164; (f) tailoring services in the space 110 based on the customizations; and the like.

Figure 4:
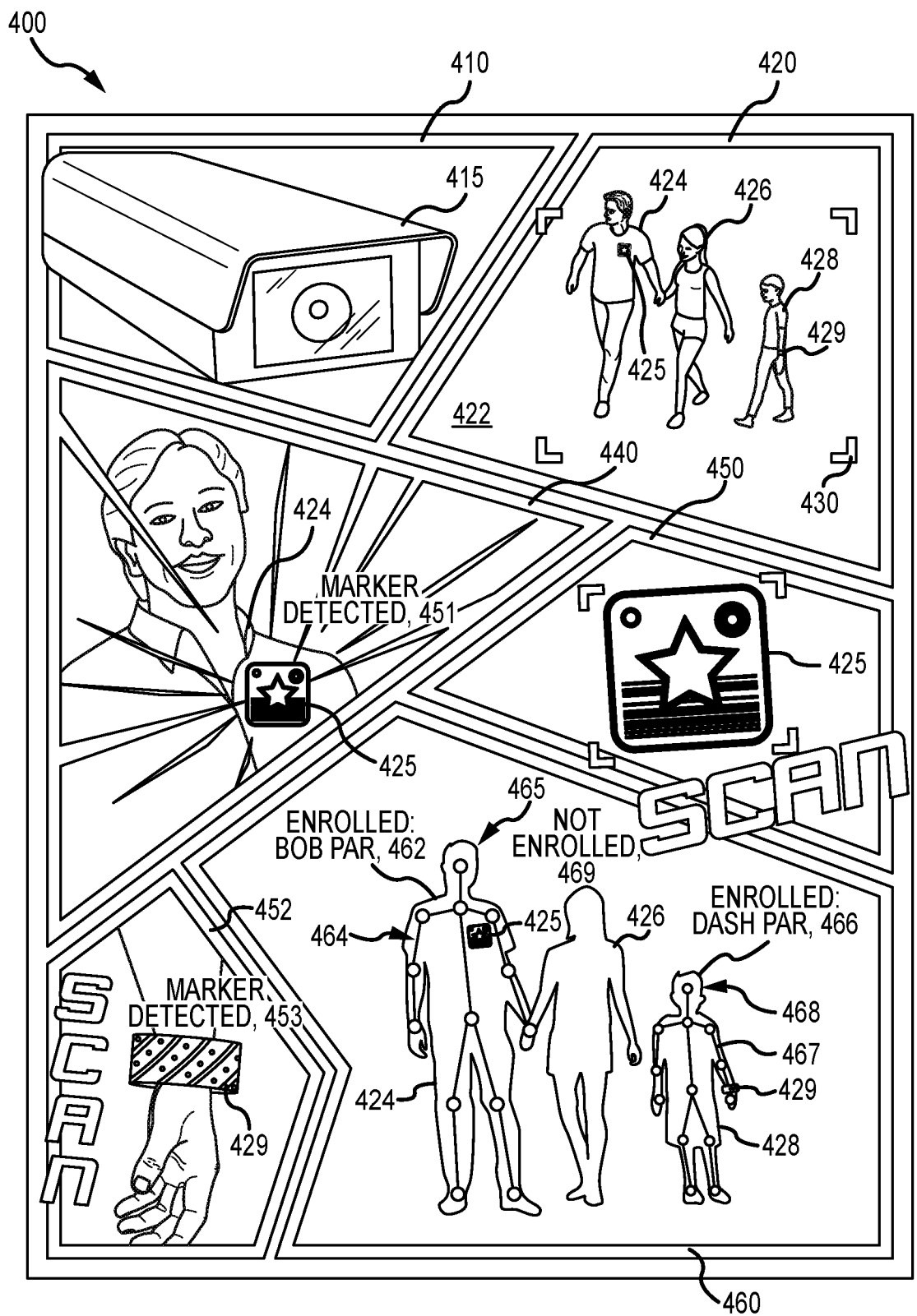
FIG. 4 illustrates using a storyboard steps performed by the preference implementation system of FIG. 1 during its operations to first identify visitors who have opted-in to a preferences program and second to use recognition technology to identify only those facility visitors.

FIG. 4 illustrates the consent validation and facial location mapping steps of a preference implementation method 400 using a set of storyboards. The method 400 may be performed by operation of the system 100 of FIG. 1 to act on customizations associated with visitors of a facility through the selective use of image recognition. In a first panel 410, a video camera 415 positioned at a location in a facility space is operated on an ongoing basis (e.g., during business hours for the facility), and the camera transmits images it captures to a preference controller for processing including determining when people wearing (or holding or otherwise physically associated with) optical markers are in the captured images.

In a second panel 420, a family or group of visitors 424, 426, and 428 have entered the space 422 monitored by the camera 415. The camera 415 provides its output/captured images to the preference controller for processing including the stream or frame 430 with visitors 424, 426, 428. Visitor 424 is wearing a pin or badge-type optical marker 425 on an outer surface of their clothing while visitor 426 is not wearing any optical markers/tokens that match a definition of an acceptable optical marker for the space 422. Visitor 428, though, is also wearing an optical marker 429 in the form of a wrist band (that is left uncovered by his clothing or in view of camera 415). In panel 440, the image/frame 430 is processed (e.g., by an opt-in verification module)

including the scan of optical marker 425 as shown in panel 450, and this provides as shown at 451 a marker identification that also acts to provide opt-in verification. Similarly, the image/frame 430 is processed including scanning the optical marker 429 on visitor 428 that provides as shown at 453 in panel 452 a marker identification that acts to provide opt-in verification for the visitor 428.

In panel 460, after the preference controller has determined that visitors 424 and 428 have opted-in to the preference program using image recognition via marker scans in storyboards 450, 452. The controller, such as with a facial region locator, creates a human skeleton model 464 and 467 for the opted in visitors 424 and 428, and this model 464, 467 is used to map the location of these two visitors' faces 465, 468 in the captured image from camera 415. Image recognition software (e.g., module 136 in FIG. 1) is then used to compare the image features or statistical model to a previously stored reference record of visitors that have provided consent to use of image recognition to recognize the visitors 424 and 428. This can be seen at 462 and 466 with visitors 424, 428 indicated as being enrolled and with their identity (e.g., a preferred name in this case but often will be their system identifier/ID value). Their identity or system ID can then be used to retrieve their customization data to individualize and otherwise enhance their experience in the facility including space 422. Because visitor 426 was not wearing (or holding) an optical marker (or decided to cover it or remove it while in space 422 with clothing or the like), the controller performs no recognition processing for the visitor 426.

Figure 5:
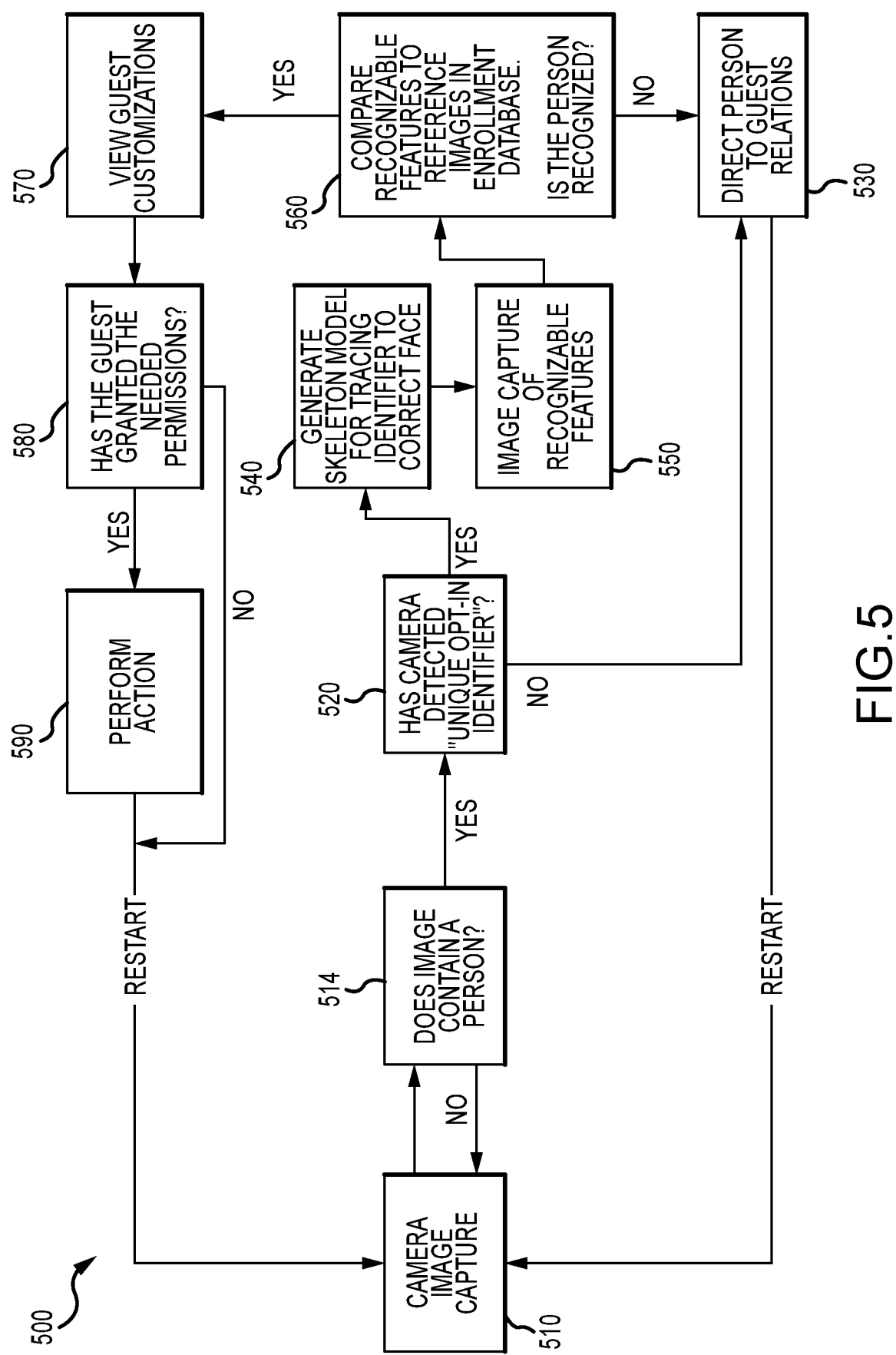
FIG. 5 is a flow diagram of an exemplary preference implementation method of the present description such as may be carried out by operations of the system of FIG. 1.

FIG. 5 illustrates a preference implementation method 500 that uses selective image recognition and that may be carried out during operations of the system 100 of FIG. 1. As discussed above, other biometric and non-biometric recognition techniques may be used in place of or in addition to facial recognition such as a finger print scanner, an eye scanning device, a finger vein detector, and so on. The method 500 starts at 510 with a camera at or near a facility operating to provide image capture of a space. The method 500 continues at 514 with processing the captured image from the camera of step 510 to determine whether the image contains a person. If not, the method 500 continues at 510 with capturing additional images (or a video stream). By inclusion of step 514, the method 500 is more efficient than previously discussed methods as scanning for optical markers is only performed when the captured image includes one or more people or visitors of a facility.

When people are present in the captured image, the method 500 continues at 520 with processing the captured image to determine whether the camera has detected a unique opt-in identifier or optical marker/token. If no optical marker is found in the image, the method 500 may continue at 530 with directing the person/visitor with no optical markers to guest relations (or for action without use of their preferences such as to a non-express access entry point, to movement about the facility space without individual interactions with workers, and so on), and the method 500 can continue with capturing more images at 510 (note, step 510 is performed in an ongoing manner or in parallel with other steps of method 500).

If, at 514 and 520, it is determined that the image includes a person and that person is associated with or wearing an optical marker, the method 500 continues at 540 with generating (such as with locator 134) a skeleton model to trace the optical marker to the correct face or facial region in the captured image. In step 550, the method 500 continues with capturing (e.g., using boundary boxes and cropping or the like) an image of the person associated with the optical marker from the frame/captured image from the camera. The method 500 continues at step 560 with comparing the captured images of recognizable features to reference images in an enrollment or opt-in database. If the image (and associated person) is not recognized, the method 500 continues at 530.

When the image is recognized in step 560, the method 500 continues at 570 with using the face recognition to identify the person in the captured image and to use this identity (e.g., a unique ID value for each opted in visitor) to retrieve or access their customizations data. The method 500 then continues at 580 with determining from the customizations data whether the identified guest/visitor has granted needed permissions for the system to act on preferences in that facility or part of the facility or has proper customizations (e.g., VIP status or the like). If not, the method 500 continues at 510. If yes, the method 500 continues at 590 with performing actions to implement the guest's/visitor's customizations (such as assisting physically challenged visitors with ingress and egress to a facility or a portion of facility, seating in a venue, special food requests, and the like). The method 500 then continues at 510 with capturing additional images or video streams.

Visitors may include any person accessing the facility or portions of it such as employees, and, in such cases, the employees can be identified to provide cash control access or to provide secured "authorized personnel only" access (e.g., back stage access, maintenance access, and so on). Employees have different privacy expectations and concerns than visitors. In a facility where both employees and visitor intermingle, the image recognition-based implementation of preferences helps to distinguish employees by using, for example, an employee badge. This allows the system to apply employee specific customizations like access control but might opt-in all employees by default to image recognition.

Although the invention has been described and illustrated with a certain degree of particularity, the particular implementations described in the present disclosure have been as examples, and numerous changes in the combination and arrangement of parts can be resorted to by those skilled in the art without departing from the spirit and scope of the invention, as claimed.

We claim:

1. A system for implementing visitor preferences at a facility using selective image recognition, comprising:
   a processor;
   memory storing an optical marker definition and, for a set of potential visitors to the facility, a reference file;
   a camera in a space of the facility capturing an image of the space;
   an opt-in verification module run by the processor processing the captured image of the space to identify, based on the optical marker definition, presence of an image of an optical marker; and
   an image recognition module run by the processor comparing features, differing from those used by the opt-in verification module to identify the optical marker, in the captured image with the reference files for the set of potential visitors to recognize one of the potential visitors,
   wherein the features are associated with a person physically associated with the optical marker, and
   wherein the image recognition module is run by the processor to compare the features only after the opt-in verification module successfully identifies the presence of the image of the optical marker in the captured image.

2. The system of claim 1, wherein the memory further stores in an opt-in record for each of the potential visitors, whereby consent to use image recognition technology is obtained prior to processing of the captured image by the image recognition module.

3. The system of claim 1, further comprising a facial region locator run by the processor to first determine the captured image includes an image of the person and second to determine a location of a face in the captured image.

4. The system of claim 3, wherein the facial region locator generates a skeleton model to trace the image of the optical marker to the image of the person and the location of the face in the captured image, whereby the optical marker is physically associated with the person in the space.

5. The system of claim 1, further comprising a customizations database in the memory including, for each of the potential visitors, a record storing customization data and wherein the system further comprises a customization implementation mechanism run by the processor that modifies one or more systems or devices at the facility based on the customization data linked to the person.

6. The system of claim 1, wherein the optical marker is one of a pin, a badge, a token, a wristband, and an article of clothing.

7. The system of claim 6, wherein the optical marker includes an outer surface with a pattern, a shape, or a color matching a pattern, a shape, or a color defined in the optical marker definition.

8. The system of claim 1, wherein the captured image includes an image of a second person not wearing or holding an object matching the optical marker definition and wherein the opt-in verification module fails to identify the presence of an image of an optical marker associated with the second person in the captured image and, in response, the facial recognition module does not process a portion of the captured image representing the second person.

9. A system for implementing visitor customizations at a facility using selective image recognition, comprising:
   an opt-in verification module processing a digital image of space of the facility to detect presence of an image of an optical marker;
   a facial region locator operating, the presence of the image of the optical marker has been verified by the opt-in verification module, to determine a location of a face associated with the optical marker in the digital image;
   after the presence of the image of the optical marker has been verified by the opt-in verification module and after the facial region locator has operated to determine the location of the face, an image recognition module obtaining an image of the face based on the location of the face determined by the facial region locator and comparing the image of the face with a plurality of reference files to recognize a visitor in the space of the facility; and
   a customizations implementation module retrieving a set of customizations for the visitor based on the recognition by the image recognition module.

10. The system of claim 9, wherein the customization implementation module further acts to modify operations of the system based on the set of customizations.

11. The system of claim 9, wherein the optical marker comprises a pin, a badge, a token, a wristband, or an article of clothing.

12. The system of claim 11, wherein the optical marker includes an outer surface with a pattern, a shape, or a color matching a pattern, a shape, or a color defined in an optical marker definition stored in memory accessible by the opt-in verification module.

13. The system of claim 9, wherein the facial region locator generates a skeleton model of the visitor to trace the image of the optical marker to an image of the visitor and the location of the face in the digital image, whereby the optical marker is linked to the person in the space.

14. The system of claim 9, wherein the plurality of reference files is provided in memory storing a plurality of records each with an identifier and one of the plurality of reference files and wherein each of the plurality of records is generated only after receiving user input indicating consent from a potential visitor to the facility for use of image recognition technology.

15. A method for implementing visitor preferences at a facility using selective image recognition, comprising:
   with a camera, capturing an image of a space of the facility;
   processing the image of the space to detect an opt-in identifier;
   when the opt-in identifier is not detected during the processing of the image of the space, repeating the capturing and processing steps;
   when the opt-in identifier is detected, capturing an image of a person, in the image of the space, associated with the opt-in identifier;
   with image recognition technology, comparing a set of recognizable features of the persons in the image references files in an opt-in database to identify a match and a visitor identity;
   when a match is identified in the comparing step, retrieving customizations linked to the visitor identity, wherein the set of recognizable features differ between at least first and second sets of visitors to the facility, whereby the visitors can choose the set of recognizable features to be used by the image recognition technology; and
   performing an action within the facility based on the retrieved customizations.

16. The method of claim 15, wherein the processing of the image of the space to detect the opt-in identifier is performed by a machine learning model trained to recognize the opt-in identifier in a camera feed.

17. The method of claim 15, further comprising, prior to the capturing an image of a person, mapping a location of a face of the person using human skeletal modeling to link the opt-in identifier to the person.

18. The method of claim 15, further comprising, prior the processing the image of the space to detect the opt-in identifier, processing the image of the space to detect presence of a human in the space and only performing the processing of the image to detect the opt-in identifier when the presence of the human is detected.

19. The method of claim 15, wherein the opt-in identifier comprises an optical marker in the form of a pin, a badge, a token, a wristband, or an article of clothing and wherein the optical marker includes an outer surface with a pattern or a color matching a pattern or color in an optical marker definition stored in memory accessible by an opt-in verification module that performs the processing of the image of the space to detect the opt-in identifier.

20. The method of claim 15, wherein the retrieved customizations are access definitions for a set of personnel for the space of the facility, whereby the method may be used to provide authorized access to employees of the facility.

\* \* \* \* \*